(12) United States Patent
Yeh et al.

(10) Patent No.: US 8,670,742 B2
(45) Date of Patent: Mar. 11, 2014

(54) RADIO COMMUNICATION SYSTEM HAVING FUNCTIONS OF REPLYING STATUS INFORMATION AND REMOTE CONTROL

(75) Inventors: Shin-Tseng Yeh, New Taipei (TW); Yi-Ming Huang, New Taipei (TW)

(73) Assignee: Unication Group/Unication Co., Ltd., New Taipei (TW)

( * ) Notice: Subject to any disclaimer, the term of this patent is extended or adjusted under 35 U.S.C. 154(b) by 37 days.

(21) Appl. No.: 13/478,049

(22) Filed: May 22, 2012

(65) Prior Publication Data

US 2013/0316694 A1    Nov. 28, 2013

(51) Int. Cl.
*H04M 11/00*      (2006.01)

(52) U.S. Cl.
USPC ............... 455/403; 455/414.1; 455/550.1

(58) Field of Classification Search
USPC .......... 455/403, 408, 410, 411, 414.1, 418, 455/419, 420, 432.3, 456.1, 456.2, 456.3, 455/458, 412.1, 550.1; 709/205, 206, 207, 709/208
See application file for complete search history.

(56) References Cited

U.S. PATENT DOCUMENTS

| | | | |
|---|---|---|---|
| 2007/0192418 A1* | 8/2007 | Adams et al. ................ | 709/206 |
| 2012/0165047 A1* | 6/2012 | Dolenc ........................ | 455/466 |
| 2012/0270523 A1* | 10/2012 | Laudermilch et al. ........ | 455/411 |
| 2013/0102336 A1* | 4/2013 | Wormald et al. ............. | 455/458 |
| 2013/0167244 A1* | 6/2013 | Turk et al. ..................... | 726/26 |

* cited by examiner

*Primary Examiner* — Jean Gelin
(74) *Attorney, Agent, or Firm* — Cheng-Ju Chiang

(57) ABSTRACT

A radio communication system having functions of replying status information and remote control, includes a console and a plurality of radio terminals, wherein each of the radio terminal is capable of transmitting corresponding Ack message about an operation status thereof to the console over a mobile communication system, if the operation status is changed. After receiving the Ack message, the console automatically or manually transmits corresponding message or a control command to the radio terminal to change the operation status of the radio terminal. Furthermore, when transmitting dispatch message, the console is capable of storing the dispatch message simultaneously in a server so as to allow the radio terminal to access the server and retrieve the stored dispatch message.

10 Claims, 4 Drawing Sheets

RADIO COMMUNICATION SYSTEM HAVING FUNCTIONS OF REPLYING STATUS INFORMATION AND REMOTE CONTROL

BACKGROUND OF THE INVENTION

1. Field of the Invention

The present invention relates to a radio communication system having functions of replying status information and remote control, and particularly to a radio communication system adapted to a text/voice pager or two-way radio, wherein a radio terminal of the communication system is capable of instantaneously replying an operation status to a console, and receiving commands from the console to change the operation status or to take corresponding action according to the commands.

2. Related ART

Traditional radio communication systems are known as text pagers, voice pagers and two-way radio. The radio communication system has a console for transmitting text/voice messages to one or more selected radio terminals through a radio frequency (RF) communication system. The radio terminal is capable of manually responding by sending an Acknowledgement (Ack) or text/voice message through the RF communication system or a mobile communication system (network).

However, the radio terminal cannot receive messages under many circumstances such as the radio terminal is off, not on duty, or away from communication range. Furthermore, radio terminals of traditional radio communication systems are often not provided with a function of responding an operation status automatically to the radio communication systems. As a result, the console fails to contact the radio terminals nor gets an actual status of the radio terminals, and therefore causes a lot of trouble and problems at work.

SUMMARY OF THE INVENTION

Accordingly, an object of the present invention is to provide a radio communication system having functions of replying status information and remote control, wherein a radio terminal of the radio communication system is capable of replying status information to a console, and receiving message and control commands from the console so as to optimize the system.

To achieve the above object, the present invention provides a radio communication system having functions of replying status information and remote control, comprising: a console and a plurality of radio terminals, wherein each of the radio terminals comprises a RF receiver module, a mobile transceiver module, a processing unit, a key set, a display unit, and a memory; the processing unit configured to connect and control all above-mentioned elements of the radio terminal so as to enable the radio terminal to receive text/voice message from the console through a RF communication system or a mobile communication system, and transmit an Ack message or the text/voice message to the console through the mobile communication system; wherein the processing unit further comprises an auto-reply module including at least one of a power on/off reply program, an on duty reply program, an area reply grogram, a monitor reply program, and a designation reply program, wherein the auto-reply module, based on a communication address indicated in received message or a built-in communication address, is configured to transmit the status information to the console through the mobile communication system for instantaneously replying an operation status of the radio terminal, if the operation status is changed, and configured to receive message or control commands from the console through either the RF communication system of the mobile communication system.

According to the present invention, the console and each of the radio terminals are provided with on the air programs (OTAP) corresponding with each other, respectively, and each the OTAP is configured to enable the console to transmit OTAP control commands to a selected radio terminal through the RF communication system, whereby the selected radio terminal is capable of operating correspondingly according to the OTAP control commands and therefore improve the practicability of the radio communication system.

DESCRIPTION OF THE PREFERRED EMBODIMENTS

Figure 1:
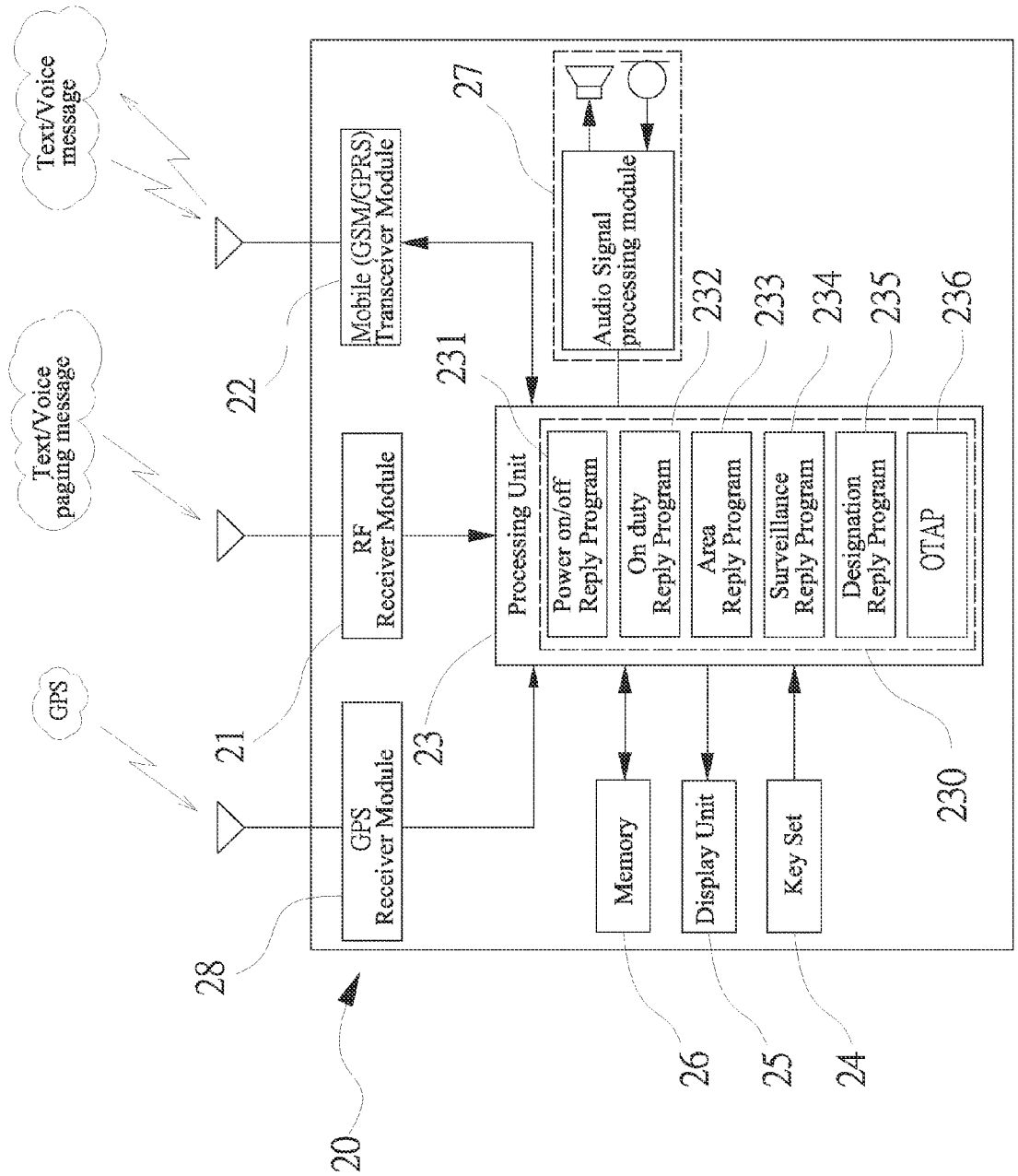
FIG. 1 is a functional block diagram of a radio terminal of the present invention.
Figure 2:
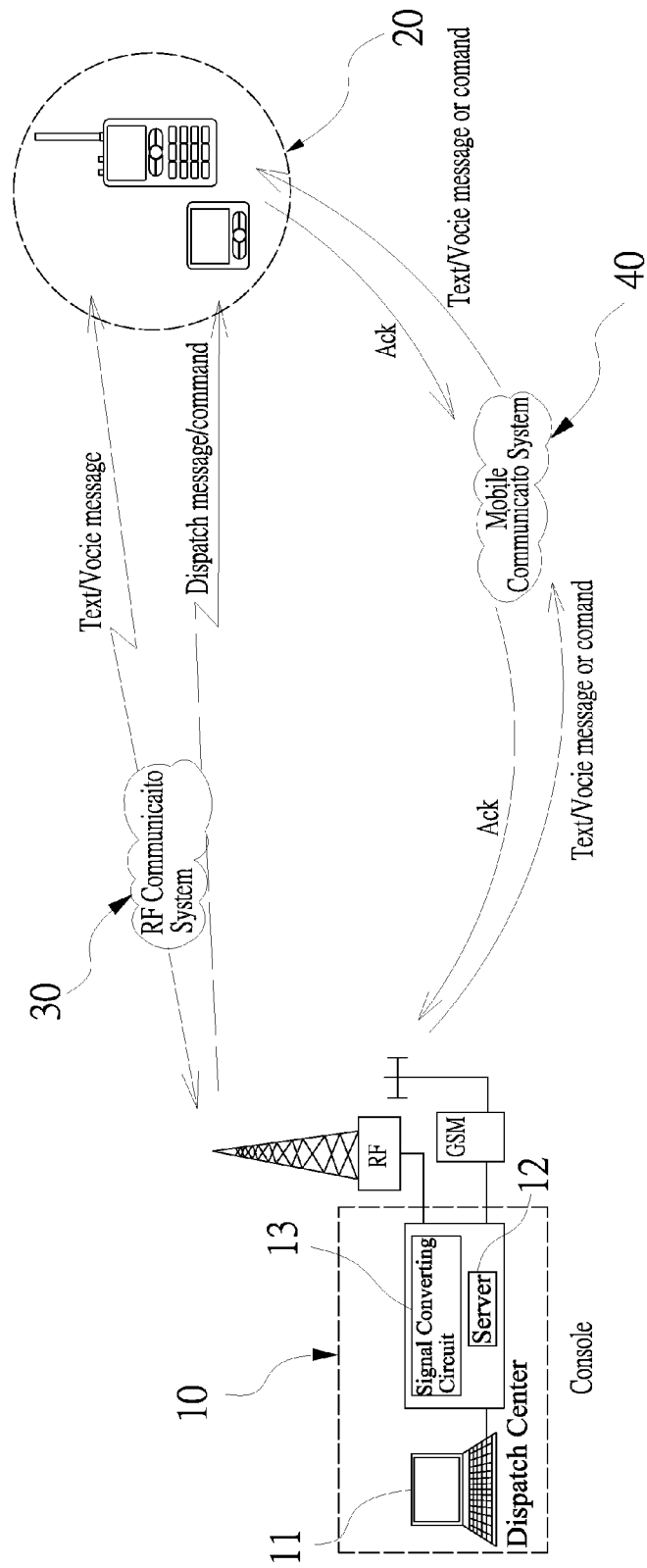
FIG. 2 is a schematic diagram showing an example of the configuration of a radio communication system according to an embodiment of the present invention.

Referring to FIGS. 1 and 2, a radio communication system having functions of replying status information and remote control of the present invention comprises a console 10 and a plurality of radio terminals 20, wherein each of the radio terminals 20 comprises a radio frequency (RF) receiver module 21, a mobile transceiver module 22, a processing unit 23, a key set 24, a display unit 25, and a memory 26. The processing unit 23 is configured to connect and control all above-mentioned elements of the radio terminal 20 so as to enable the radio terminal 20 to receive a text/voice message (including a dispatch message or paging message both transmitted in a paging format) from the console 10 through a RF communication system 30, and transmit an Ack message to the console 10 through the mobile communication system 40, and transmit or receive the text/voice message to or from the console 10 in Short Message Service/General Packet Radio Services (SMS/GPRS) format through the mobile communication system 40. Each of the radio terminals 20 further has an audio signal processing module 27, such as a two-way radio or voice pager, for performing two-way of voice communication.

The processing unit 23 comprises an auto-reply module 230 including one of a power on/off reply program 231, an on duty reply program 232, an area reply grogram 233, a monitor reply program 234, and a designation reply program 235. The auto-reply module 230 is configured to transmit status information to the console 10 or a dispatch center 11 (located adjacent to the console 10) through the mobile communication system 40 in SMS/GPRS format for instantaneously replying an operation status of the radio terminal 20 to the console 10 or dispatch center 11, if the operation status is changed, based on a communication address indicated in the received text/voice message or a built-in communication address (for example, the communication address is stored in the memory, a phone book or written in a program). Furthermore, the auto-reply module 230 is configured to receive messages or control commands from the console 10 over the RF communication system 30 or the mobile communication system 40.

The power on/off reply program 231 is configured to automatically transmit a corresponding power on Ack message to the console 10 through the mobile communication system 40 when the radio terminal 20 is turned on (the radio terminal is automatically turned on or off when the radio terminal has low battery), or transmit a corresponding power off Ack message to the console 10 through the mobile communication system 40 when the radio terminal 20 is turned off, so as to allow the console 10 to know, at any time, how many users are on line. Furthermore, when the console 10 receives the power off Ack message, the console 10 is capable of manually transmitting a control command to the radio terminal 20 (through the RF or mobile communication system 30, 40) to forcefully change a status of the radio terminal from power off to a standby status of power on. As a result, the radio terminal 20 remains in an alarm status and can be awoken, and is capable of receiving the dispatch message or carrying out voice communication. Moreover, the radio terminal 20 will automatically transmit the power on Ack message to the console 10 when the radio terminal 20 turns to be the standby status of power on.

The on duty reply program 232 is configured to automatically transmit a corresponding on/off duty Ack message to the console 10 through the mobile communication system 40 by automatically initiating the mobile transceiver module 22, wherein when the radio terminal 20 is off duty, it temporarily stops the function of receiving message and is unable to play alarm sound when receiving a call signal in order to avoid being disturbed. When the console 10 receives the off duty Ack message, the console 10 is capable of manually transmitting a control command to the radio terminal 20 to forcefully change the status of the radio terminal 20 from off duty to a standby status of on duty. As a result, the radio terminal 20 is capable of receiving the dispatch message or carrying out voice communication for being recruited for an assignment. Furthermore, when receiving the call signal of the alarm sound in a status of on or off duty, the radio terminal 20 will automatically transmit a corresponding on/off duty Ack message to the console 10. Likewise, the radio terminal 20 can automatically transmits the on duty Ack message to the console 10 when the radio terminal 20 is remotely controlled by the console 10 to change the status from off duty to the standby status of on duty.

The area reply program 233 is configured to automatically initiate the mobile transceiver module 22 to transmit an out of range Ack message to the console 10 through the mobile communication system 40 when the radio terminal 20 fails to receive dummy messages or detection signals from the console 10 for a set period of time because the radio terminal 20 is out of a RF communication area. Furthermore, once the radio terminal 20 returns to the RF communication area and receives the dummy messages or detection signals from the console 10 for a set period of time, the radio terminal 20 is configured to automatically initiate the mobile transceiver module 22 to transmit an in range Ack message to the console 10 through the mobile communication system 40. Furthermore, when the console 10 receives the out of range Ack message, the console 10 is capable of manually or automatically transmitting a control command to the radio terminal 20 so as to enable the radio terminal 20 to initiate the mobile transceiver module 22 instead of the RF receiver module 21 being originally initiated, and to receive the text/voice/dispatch message from the console 10 through the mobile communication system 40. Due to the fact that a communication range of the mobile communication system 40 is greatly larger than that of the RF communication system 30, an effective distance that the radio terminal 20 is capable of receiving the text/voice/dispatch message is greatly extended accordingly.

Figure 3:
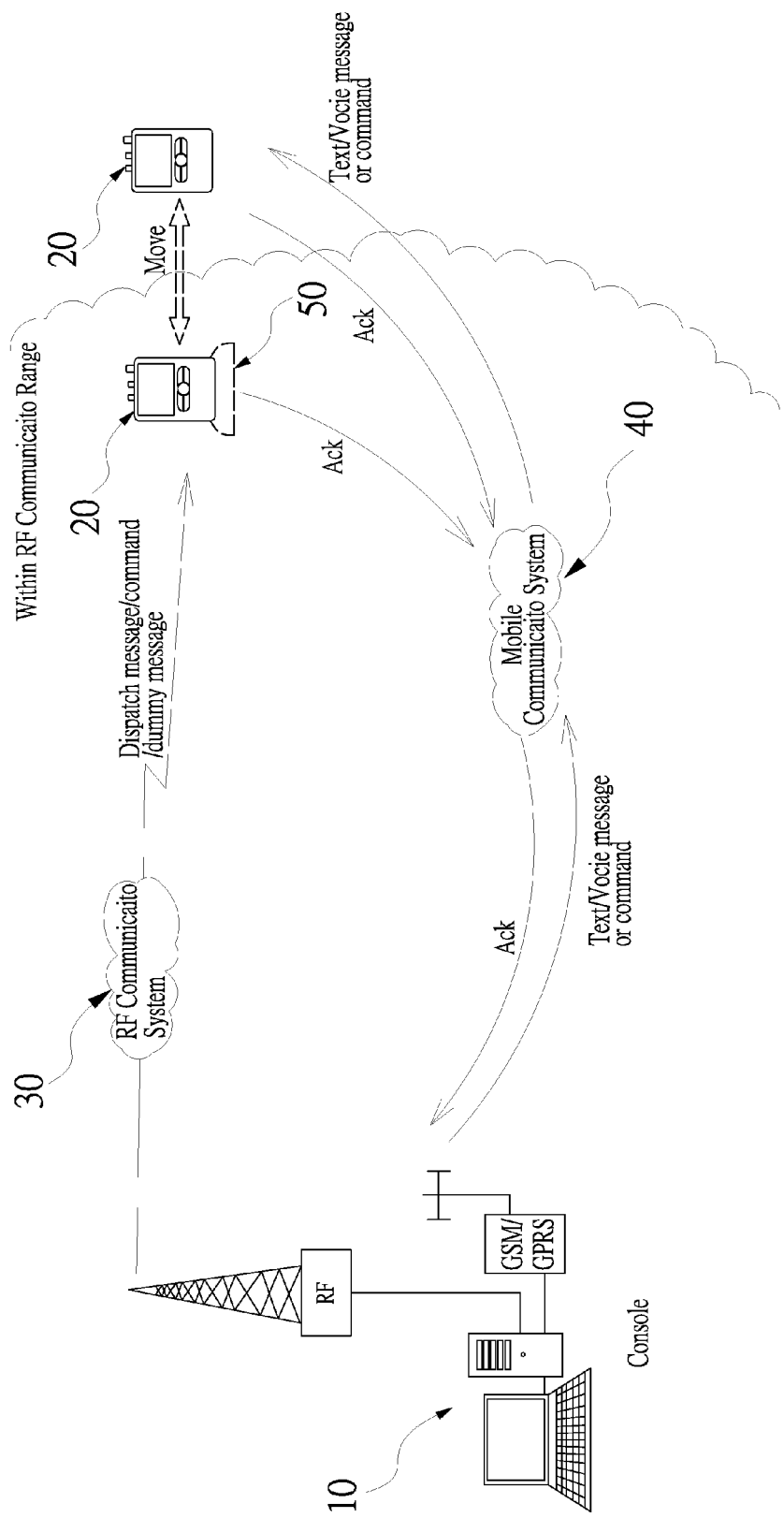
FIG. 3 is a schematic diagram showing another example of the configuration where a radio terminal is put on a charge or moves out of a communication range.

Referring to FIG. 3, when the radio terminal 20 is put on a charger 50 and the monitor reply program 234 is initiated, and if the charger 50 receives a detection signal from a control apparatus (the control apparatus intended for controlling electrical control elements of other electronic or mechanical devices for switching, and can be integrated in the charger), the charger 50 will transmit a signal to the radio terminal 20, whereby the radio terminal 20 automatically initiate the mobile transceiver module 22 to transmit an Ack message of the detection signal to the console 10 through the mobile communication system 40. Then the console 10 is capable of manually transmitting a control command to the radio terminal 20 to enable the radio terminal 20 to transmit the control command to the control apparatus over the charger 50 so as to perform remote control on external devices or to change status of the external devices.

Referring to FIG. 2, a server 12 is linked to the console 10. When the console 10 transmits the text/voice message to a selected radio terminal 20, the console 10 simultaneously stores the dispatch message in the server 12. The console 10 further comprises a signal converting circuit 13 for converting a voice message into a text message. The designation reply program 235 is configured to automatically or manually initiate the mobile transceiver module 22 to transmit an Ack message of designating control message to the server 12, according to an assigned communication address, through the mobile communication system 40. Accordingly, the server 12 automatically retransmits the designation control message or transmits the dispatch message stored in the server 12 to the radio terminal 20 through the mobile communication system 40, according to commands of the designating control message. The designating control message transmitted from the radio terminal 20 includes a command of retransmitting voice message or text message or a command of transmitting text message converted from the voice message.

Figure 4:
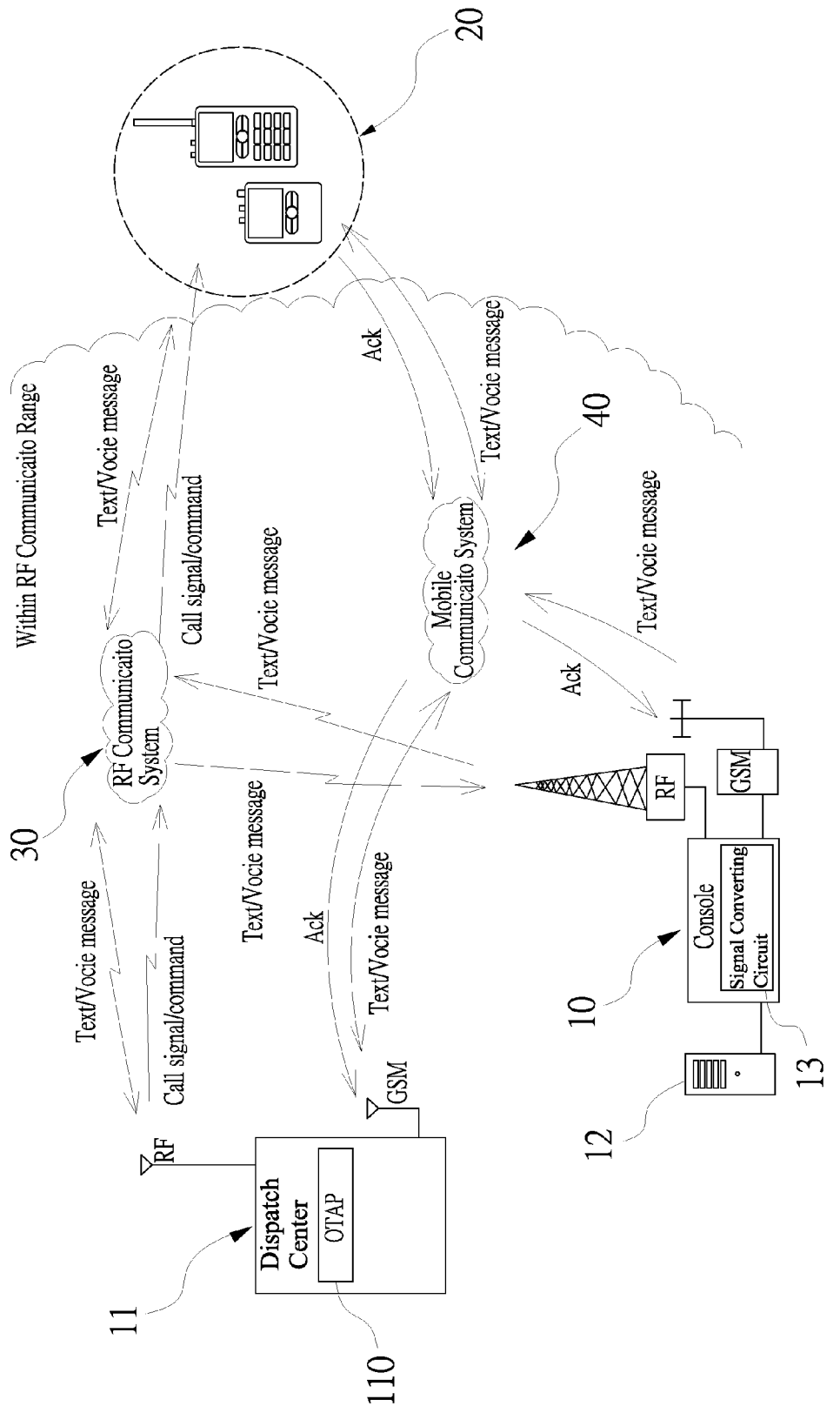
FIG. 4 is a schematic diagram showing another example of the configuration where a dispatch center is not located adjacent to a console.

Referring to FIG. 4, when the dispatch center 11 is not located adjacent to the console 10, for example, the dispatch center 11 moving to a mobile command station in an event scene. The console 10 monitors signals of the text/voice message transmitted from the dispatch center over the RF communication system 30, and then the console 10 receives and stores the dispatch message in the server 12 over the RF communication system 30.

Referring to FIGS. 1, 2 and 4, a selective call signal of a dispatch message transmitted in paging format from the console 10 of a traditional radio communication system (such as 2 tone or 5 tone pagers or radios) is detectable by the radio terminal 20 with low RF sensitivity, the traditional radio terminal 20, generally, is capable of easily receiving a call signal of alarm sound from the console 10 (or the dispatch center 11), and then automatically transmitting an Ack message and making alarm sound to remind a user to read the dispatch message. However, the radio terminal 20 is also likely to fail to receive the dispatch message for the user to read because of too weak text/voice signals or because the radio terminal 20 is blocked by obstacles. Under such circumstances, the console 10 usually cannot obtain an actual status that the dispatch message transmitted in paging format is not received by the radio terminal 20. Therefore, the console 10 takes no action of transmitting again the dispatch message to the radio terminal 20 to allow the user to automatically or manually use the radio terminal 20 to transmit the designating control message to the server 12, whereby to enable the server 12 to retrieve a dispatch message which was stored in the server 12, and retransmits or transmits text/voice dispatch message to the radio terminal 20 through the mobile communication system 40 (GSM/GPRS). Because transmitting distance of the RF communication system 30 is shorter than that of the mobile communication system 40, the radio communication system of the present invention utilizes the mobile communication system 40 to successfully extend communication range and coverage.

Referring to FIGS. 1 and 4, the dispatch center 11 (or the console 10) and each of the radio terminals 20 are provided with OTAP (on the air programs) 110, 236 corresponding with each other, respectively. Each the OTAP is configured to enable the dispatch center 11 to transmit OTAP control commands to a selected radio terminal 20 through the RF communication system 30, whereby the selected radio terminal 20 is capable of operating correspondingly according to the OTAP control commands, so as to enable a remote control between the dispatch center 11 and the radio terminal 20 and therefore improve the practicability of the radio communication system of the present invention.

The OTAP control commands are intended to perform at least five or more than five functions of: designating frequency, designating bandwidth, changing identification (ID) (including frequency of 2-tone paging, 5-tone call ID No., and Motorola Data Communications (MDC) call ID No.), a lock (switch) control, receiving the OTAP control commands when being locked, switching on, switching a paging mode to a GSM mode, switching the status of off duty to on duty, initiating an emergency call or a conference call, initiating the GPS, changing dates and time, changing daylight saving time, designating Gaussian Mixture Model (GMM) Ack phone number, designating GPRS Ack Internet Protocol (IP) address and port, designating a paging system of a voice pager, changing a setting of a squelch level, designating a squelch type of a speaker of a voice pager, changing a setting of on/off duty of ID, changing a setting of a priority of ID, changing a scan list being received, changing a receiving mode of a voice pager, changing a setting of sound recording of a voice pager, changing an alert pattern of a pager sounding (playing) at a set time, and changing a setting of reminder alert of a pager.

Each of the radio terminals 20 further has a global positioning system (GPS) receiver module 28 intend to receive coordinate data from a GPS satellite, and to provide coordinate data about a current position of the radio terminal 20 to the console 10 through the mobile communication system 40 at the same time when transmitting Ack message as mentioned above. The position of the radio terminal 20 is indicated on a monitor screen of the console 10 to facilitate control and management for an operator.

Accordingly, the radio communication system having functions of replying status information and remote control of the present invention is capable of automatically and instantaneously replying operation status of a radio terminal to a console, and receiving control message from the console to remote control the radio terminal.

It is understood that the invention may be embodied in other forms within the scope of the claims. Thus the present examples and embodiments are to be considered in all respects as illustrative, and not restrictive, of the invention defined by the claims.

What is claimed is:

1. A radio communication system having functions of responding status information and remote control, comprising: a console and a plurality of radio terminals, wherein each of the radio terminals comprises a radio frequency (RF) receiver module, a mobile transceiver module, a processing unit, a key set, a display unit, and a memory; the processing unit configured to connect and control all the other elements of the radio terminal so as to enable the radio terminal to receive a text/voice message from the console through an RF communication system or a mobile communication system, and transmit an Acknowledgement (Ack) message or the text/voice message to the console through the mobile communication system; wherein the processing unit further comprises an auto-reply module including at least one of a power on/off reply program, a duty reply program, an area reply program, a monitor reply program, and a designation reply program, wherein the auto-reply module, based on a communication address indicated in the received text/voice message or a built-in communication address, is configured to transmit the status information to the console through the mobile communication system for instantaneously responding an operation status of the radio terminal, if the operation status is changed, and to receive messages or control commands from the console through the RF communication system or the mobile communication system; and wherein the designation reply program is configured to automatically or manually initiate the mobile transceiver module to transmit an Ack of a designating control message to a specific server through the mobile communication system, so as to enable the server to automatically retransmit a dispatch message stored in the server to the radio terminal through the mobile communication system, according to commands of the designating control message.

2. The radio communication system of claim 1, wherein the power on/off reply program is configured to automatically transmit a corresponding power on or off Ack message to a dispatch center through the mobile communication system when the power on/off reply program is manually or automatically turned on or off, and when the dispatch center receives the power off Ack message, the dispatch center is capable of manually transmitting a control command to the radio terminal to change a status of the radio terminal from power off to a standby status of power on.

3. The radio communication system of claim 1, wherein the duty reply program is configured to automatically transmit a corresponding on/off duty Ack message to the console through the mobile communication system when the radio terminal is manually set to be a status of on or off duty, and when the console receives the off duty Ack message, the console is capable of manually transmitting a control command to the radio terminal to change the status of the radio terminal from off duty to a standby status of on duty.

4. The radio communication system of claim 1, wherein the area reply program is configured to automatically transmit a corresponding out of or in range Ack message to the console through the mobile communication system when the radio terminal is leaving or entering an RF communication area, and when the console receives the out of range Ack message, the console is capable of automatically transmitting a control command to the radio terminal to enable the radio terminal to remain in a standby status that the mobile transceiver module is initiated, and to receive the text/voice message from the console through the mobile communication system.

5. The radio communication system of claim 1, wherein when the radio terminal is put on a charger, and the charger receives a detection signal from a control apparatus, the charger will transmit a signal to the radio terminal where the monitor reply program automatically transmits an Ack message of the detection signal to the console through the mobile communication system, and then the console is capable of manually transmitting a control command back to the radio terminal, whereby the radio terminal further transmits the control command to the control apparatus over the charger so as to perform remote control on external devices.

6. The radio communication system of claim 1, wherein the designating control message transmitted from the radio terminal includes at least one of commands of retransmitting a voice message, and transmitting a text message converted from the voice message.

7. The radio communication system of claim 1, wherein the server is linked to the console, and the console simultaneously stores the dispatch message in the server when transmitting the dispatch message.

8. The radio communication system of claim 7, wherein the console further comprises a signal converting circuit for converting the voice message into the text message for being stored in the server.

9. The radio communication system of claim 7, wherein the dispatch message stored in the server is originally transmitted from a dispatch center in such a way that the console monitors a signal of the dispatch message through the RF communication system and then receives and stores the dispatch message in the server through the RF communication system.

10. The radio communication system of claim 1, wherein the console and each of the radio terminals are provided with on the air programs (OTAP) corresponding with each other, respectively, and each the OTAP is configured to allow the console to transmit OTAP control commands to a selected radio terminal through the RF communication system, whereby the selected radio terminal is capable of operating correspondingly according to the OTAP control commands.

\* \* \* \* \*